United States Patent Office 3,379,008
Patented Apr. 23, 1968

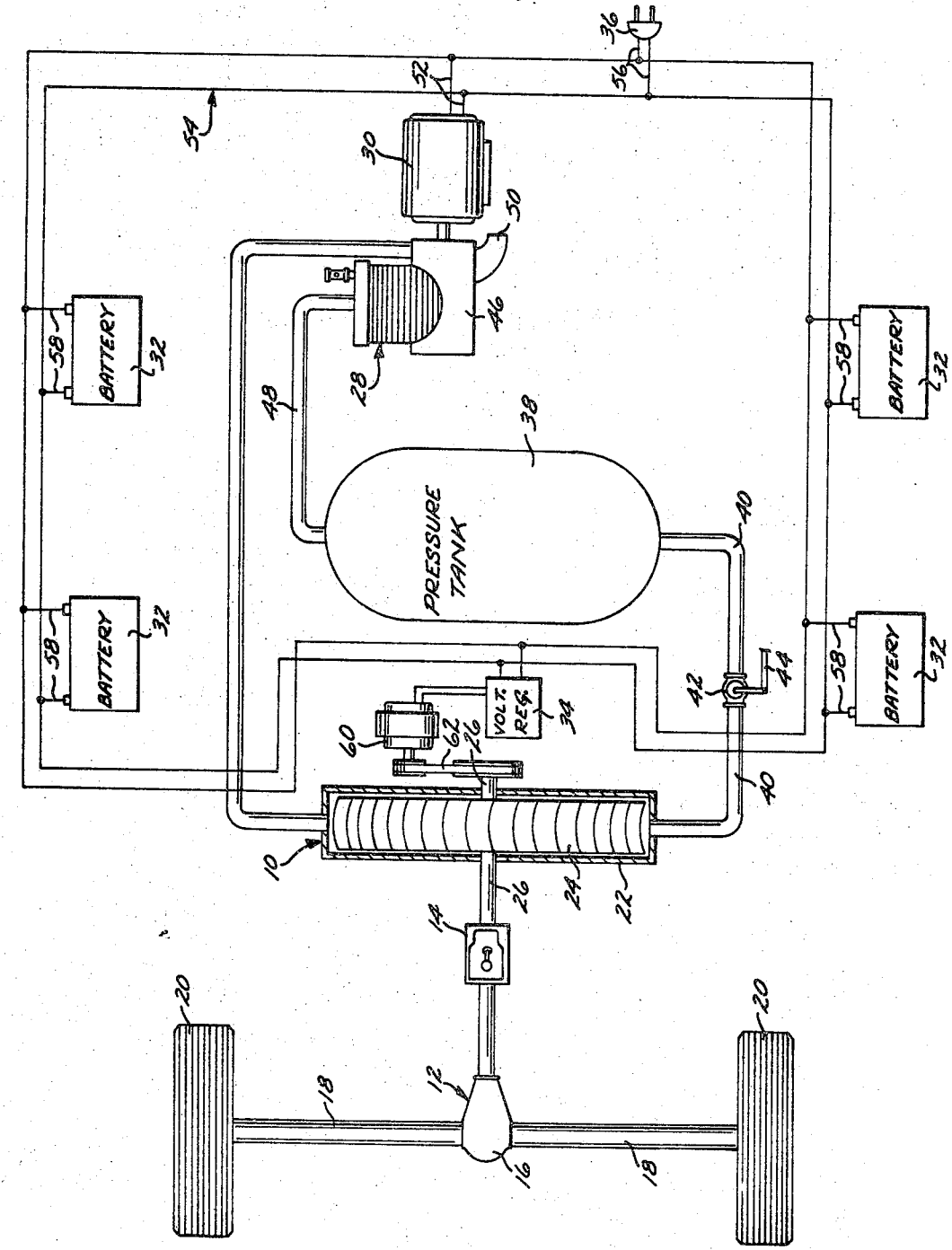

3,379,008
FLUID PRESSURE SYSTEM FOR OPERATING
A VEHICLE DRIVE
Carl A. Manganaro, 1971 El Monte Drive,
Thousand Oaks, Calif. 91360
Filed May 5, 1966, Ser. No. 547,838
4 Claims. (Cl. 60—57)

ABSTRACT OF THE DISCLOSURE

A turbine drive system for propulsion of a vehicle and in which the turbine is driven by air compressed by a compressor which is driven by an electric motor, the motor being operable by batteries in circuit with an alternator which is driven by the turbine.

The present invention relates to a fluid pressure system for operating a vehicle drive, and more particularly to a system in which a battery operated motor is utilized to operate the means for supplying fluid under pressure to operate the vehicle drive.

It is an object of the present invention to provide a fluid pressure system for operating a vehicle drive to propel a vehicle, and which is economical to operate, relatively inexpensive to manufacture, and completely free of the noxious and irritating gases which characterize the operation of conventional internal combustion engines.

Another object of the invention is to provide a fluid pressure system of the aforementioned character which is characterized by simplicity of construction, relatively few moving parts, and a simple to operate fluid flow throttle for regulating the speed of the vehicle.

Yet another object of the invention is to provide a fluid pressure system of the aforementioned character which includes a compressor for supplying compressed air to a reservoir coupled to a turbine which is connected to the vehicle drive, and which further includes a battery operable electric motor to drive the air compressor. The battery circuit includes means for detachably coupling the circuit to a separate source of enregy for periodically recharging the batteries, so that the vehicle can be driven during the day under battery power, the circuit plugged into a separate source of electrical energy for overnight recharging of the batteries, and the vehicle again driven the following day on the recharged batteries.

Other objects and features of the invention will become apparent from consideration of the following description taken in connection with the accompanying drawings, in which:

The lone drawing figure is a diagrammatic view of a fluid pressure system for operating a vehicle drive according to the present invention.

Referring now to the drawing, there is illustrated a fluid pressure system 10 for operating a vehicle drive 12. The driven vehicle (not shown) may be a boat, aircraft, motor vehicle or the like, and for illustration is sometimes referred to herein as an automobile.

The vehicle drive 12 includes a transmission 14, a differential 16 connected to and operated by the transmission 14, axle sections 18 rotatable by the differential 16, and wheels 20 carried by the axle sections 18 for rotation to propel the associated vehicle or automobile. The wheels 20 are usually the rear wheels of the automobile, the front wheels being omitted from the drawings for brevity.

The differential 16 is conventional in charcter, being operative to permit the wheels 20 to rotate at different speeds, as when the automobile is rounding a corner. The transmission 14 is operative to select a desired vehicle speed or to back the automobile, as is well known. Since these components are so well known in the art, details of their construction and operation are omitted for brevity, it being important primarily to note that they are merely exemplary of one form of vehicle drive which is operable by the fluid pressure system 10.

The fluid pressure system 10 includes, generally, a turbine 22 having a vaned rotor 24 whose shaft 26 is connected to the transmission 14, the rotor 24 being responsive to fluid under pressure to operate the vehicle drive 12, as will be seen. The system 10 further includes a means or apparatus 28 which is operative to supply fluid under pressure to the turbine 22; an electric motor 30 for operating the apparatus 28; a plurality of electric batteries 32 in circuit with the motor 30 for energization thereof; generating means connected to the rotor shaft 26 for generating electrical energy for the batteries 32; a voltage regulator 34; and an electrical plug 36 or the like for detachably coupling the battery and motor circuit to a separate source of energy for periodically recharging the batteries 32, as will be described in more detail below.

The turbine 22 is exemplary of one form of air motor which is operative to convert pressurized fluid into the mechanical energy necessary to rotate the drive or rotor shaft 26 for propelling the automobile. The turbine 22 is only diagrammatically shown since the details of its construction are conventional. The turbine rotor 24 is driven at relatively high rotational speeds by pressurized fluid passing from a pressure tank, receiver, or reservoir 38 through a conduit 40 and under the control of a throttle valve 42 located in the conduit 40.

The valve 42 is of conventional construction, including a movable section (not shown) which is operative by a throttle linkage 44 to close off and thereby regulate the flow of fluid through the conduit 40. The linkage 44 extends into a position for easy operation by the vehicle driver so that the speed of the vehicle can be closely controlled.

The fluid preferably utilized in the fluid pressure system 10 is compressed air which is compressed by means of a compressor 46, the compressor 46, the reservoir 38, and the valve 42 comprising the previously mentioned apparatus 28 for supplying compressed air to the turbine 22. The compressor 46 is preferably a conventional positive displacement piston type, and is connected to the reservoir 38 by a conduit 48. In addition, if the vehicle with which the system 10 is associated operates at comparatively high speeds, the intake end of the compressor 46 is also provided with an air intake scoop 50 to receive ram air for compression.

The compressor 46 is mechanically coupled to the electric motor 30 which, as previously indicated, is energized by electrical energy from the batteries 32. The motor 30 is conventional in construction and is connected by suitable electrical leads 52 to a motor-battery circuit 54, the plug 36 being connected to the circuit 54 by leads 56, and the batteries 32 being connected to the circuit 54 by leads 58.

When the driven vehicle is not being operated, the circuit 54 can be utilized for recharging the batteries 32. This is done by connecting the plug 36 to an outside or independent source of electrical energy (not shown), such as the usual household circuit of a residence. Since the system 10 illustrated is a direct current system, the usual alternating household current would have to be suitably rectified to operate the motor 30 and recharge the batteries 32. However, the system 10 could alternatively be made an alternating current systems, if desired, except for rectification of the charging current to the batteries 32, as will be apparent. Normally the motor 30 is operated by electrical energy drawn from the batteries 32 through the electrical circuit 54.

A number of other conventional components are also used in conjunction with the reservoir 38, motor 30 and batteries 32, but their description has been omitted for brevity and because the need for their inclusion will be apparent to those skilled in the art. For example, a suitable switch (not shown) is incorporated in the circuit 54 in order to connect and disconnect the motor 30 from the batteries 32; safety fuses (not shown) would be incorporated in the circuits where needed; and pressure relief valves would be used with the compressor 46 and reservoir 38 to vent dangerously high pressures.

A voltage regulator 34 is incorporated in the circuit 54, being electrically coupled to a generator 60 which is operative in the manner of the usual automobile generator to recharge the batteries 32 under certain conditions. The generator 60 is coupled by a chain or pulley drive 62 to the rotor shaft 26 so that during operation of the turbine 22, the generator 60 applies electrical energy to the batteries 32 at such times as the batteries are not discharging at a high rate, as during a downhill run of the vehicle. Only limited recharging of the batteries 32 is possible during operation of the vehicle, the batteries 32 being periodically recharged by coupling of the circuit 54 to the separate source of electrical energy, as above-indicated.

Although not shown, the reservoir 38 can also be provided with means enabling its connection to a separate source of compressed air, such as would be available in an automobile service station. This would permit the reservoir 38 to be pressurized to the desired level without running the motor 30 and compressor 46, as on initial start-up. Ordinarily however, the pressure level in the tank 38 can be maintained for a considerable period of time so that such outside pressurization will usually not be necessary.

In operation, the circuit 54 is coupled to the vehicle owner's residential electrical circuit for overnight charging of the batteries 32, the capacity and number of batteries 32 preferably being such that the vehicle can be operated at moderate speeds during the day without additional charging. Upon disconnection of the circuit 54 from the household circuit, a suitable switch (not shown) is operated to connect the motor 30 to the batteries 32 to thereby operate the compressor 46. When the appropriate pressure level is reached in the reservoir 38, the operator actuates the throttle linkage 44 to open the throttle valve 42 and thereby supply compressed air to the turbine rotor 24. Consequent rotation of the rotor 24 drives the wheels 20 to propel the vehicle, as will be apparent.

From the foregoing it is seen that a fluid pressure system has been provided for operating a vehicle drive, and which for this purpose utilizes a turbine operated by fluid under pressure provided by an apparatus 28 which is driven by an electric motor 30 deriving its energy from a plurality of batteries 32.

Various modifications and changes may be made with regard to the foregoing detailed description without departing from the spirit of the invention or the scope of the following claims.

I claim:
1. A fluid pressure system for operating a vehicle drive to propel a vehicle, said system comprising:
   a turbine having a vaned rotor for connection to said vehicle drive and responsive to fluid under pressure to operate said vehicle drive;
   means normally operative to continuously supply said fluid under pressure to said turbine and including a throttle valve for regulating the rate of flow of said fluid to said turbine;
   an electric motor connected to said means for operation thereof;
   electric batteries in circuit with said electric motor for energization thereof;
   generating means connected to and operative by said rotor for generating electrical energy, said generating means being coupled in said circuit with said batteries;
   a voltage regulator in said circuit;
   and means for detachably coupling said circuit to a separate source of energy for periodically recharging said batteries.

2. A fluid pressure system according to claim 1 wherein said first-mentioned means includes an air compressor connected to said motor; and
   a compressed air reservoir coupled to said air compressor and coupled to said turbine through said throttle valve.

3. A fluid pressure system according to claim 2 wherein said air compressor includes an air intake scoop operative to receive ram air during forward movement of said vehicle.

4. A fluid pressure system according to claim 1 and including means for conveying fluid exhausted from said turbine to said first-mentioned means.

References Cited
UNITED STATES PATENTS

| | | | |
|---|---|---|---|
| 1,206,493 | 11/1916 | Wulferding | 60—57 |
| 1,394,076 | 10/1921 | Fitzgibbon | 60—57 |
| 2,112,633 | 3/1938 | Moon | 60—62 |

FOREIGN PATENTS

| | | |
|---|---|---|
| 468,071 | 4/1914 | France. |
| 640,120 | 3/1928 | France. |

EDGAR W. GEOGHEGAN, *Primary Examiner.*